(12) United States Patent
Eichblatt et al.

(10) Patent No.: US 7,548,793 B2
(45) Date of Patent: Jun. 16, 2009

(54) ON-LINE PROCESS SPECIFICATION ADJUSTING AND COMPONENT DISPOSING BASED ON PREDICTIVE MODEL OF COMPONENT PERFORMANCE

(75) Inventors: Stephen L. Eichblatt, Matawan, NJ (US); Laurence S. Samuelson, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 369 days.

(21) Appl. No.: 11/486,816

(22) Filed: Jul. 14, 2006

(65) Prior Publication Data

US 2008/0015725 A1 Jan. 17, 2008

(51) Int. Cl.
*G06F 19/00* (2006.01)
*G05B 13/02* (2006.01)
*G06F 17/18* (2006.01)

(52) U.S. Cl. ..................... 700/108; 700/51; 702/179
(58) Field of Classification Search .................. 700/28, 700/32–37, 51, 52, 108–110; 702/179–187
See application file for complete search history.

(56) References Cited

U.S. PATENT DOCUMENTS

| | | | |
|---|---|---|---|
| 5,047,947 A | 9/1991 | Stump | |
| 5,765,137 A | 6/1998 | Lee | |
| 5,862,054 A * | 1/1999 | Li | ............................. 700/121 |
| 5,956,251 A | 9/1999 | Atkinson et al. | |
| 5,987,398 A * | 11/1999 | Halverson et al. | ........... 702/179 |
| 6,353,767 B1 * | 3/2002 | Wakeman et al. | ............. 700/91 |
| 6,480,808 B1 * | 11/2002 | Early et al. | ................. 702/179 |
| 6,789,031 B2 * | 9/2004 | Wang | .......................... 702/81 |
| 6,823,287 B2 | 11/2004 | Shafer et al. | |
| 7,117,057 B1 * | 10/2006 | Kuo et al. | .................... 700/108 |
| 7,177,773 B2 * | 2/2007 | Lonn et al. | ..................... 702/81 |
| 7,181,355 B2 * | 2/2007 | Kondo et al. | .................. 702/84 |
| 7,219,068 B2 * | 5/2007 | Zelek et al. | ..................... 705/7 |
| 7,272,532 B2 * | 9/2007 | Shafer et al. | ................ 702/183 |
| 7,356,377 B2 * | 4/2008 | Schwarm | .................... 700/108 |
| 7,418,307 B2 * | 8/2008 | Katircioglu | ................. 700/106 |
| 2003/0220709 A1 | 11/2003 | Hartman et al. | |
| 2006/0100940 A1 * | 5/2006 | Kakouros et al. | ............. 705/28 |

FOREIGN PATENT DOCUMENTS

| | | |
|---|---|---|
| JP | 7105242 | 4/1995 |
| JP | 11175577 | 7/1999 |
| JP | 2002082995 | 3/2002 |
| JP | 2003132103 | 5/2003 |
| JP | 2003141192 | 5/2003 |

OTHER PUBLICATIONS

C. Apte, et al. "Predicting Defects in Disk Drive Manufacturing: A Case Study in High-Dimensional Classification" IEEE Annual Conf. on AI Applications (Mar. 1993).
"Case Study: Western Digital Rewrites Industry Standards for Quality with a Global Data Warehouse" KPMG LLP (Aug. 5, 1999).
Robert A. Rutledge, et al. "Data Warehousing for Manufacturing Yield Improvement" SAS Users Group Int'l Paper 134-25 (Apr. 9, 2000).

* cited by examiner

*Primary Examiner*—M. N. Von Buhr (57) ABSTRACT

A disposition process involves a part proceeding through a sequence of fabrication steps. The process involves obtaining a specified parameter for the part at an individual fabrication step; measuring the specified parameter of the part at the individual fabrication step; obtaining a final specified parameter for the part upon completion of the sequence of fabrication steps; and disposing the part at the individual fabrication step. Disposing the part uses a calculation of probability of the part meeting the final specified parameter.

19 Claims, 6 Drawing Sheets

ON-LINE PROCESS SPECIFICATION ADJUSTING AND COMPONENT DISPOSING BASED ON PREDICTIVE MODEL OF COMPONENT PERFORMANCE

TECHNICAL FIELD

This invention relates generally to the field of statistical quality control; and in particular a method of disposing parts and adjusting subsequent process specification tolerances based on preceding process results.

BACKGROUND ART

The purpose of all manufacturing processes is to manufacture a part that meets performance expectations while doing so at the lowest possible cost. There are many varied factors that affected the cost of a part. To name a few, there are costs associated with material, labor, fabrication steps, testing, and yield. The content of this invention addresses the cost that is associated with yield. When a part is rejected from a process, unless the part can be reworked, all the cost associated with fabricating the part up to the point of rejection is thrown away with the part. The cost associated with reworking the part also accumulates in the total part cost. The parts that leave a process bear the cost associated with rejected and reworked parts.

In the manufacturing community there are many methods and techniques that are well known in the art for controlling the yields of a manufacturing process and consequently the cost associated with yield. Copious amounts of data are collected on measured parameters of components fabricated in manufacturing processes in attempts to control yields and cost. Most techniques practiced in industry today focus on predicting and controlling trends in a manufacturing process. Some of these techniques are described briefly below. The following descriptions are presented only as an overview of process control techniques, and are not intended to be an exhaustive listing of all process control techniques.

Figure 1:
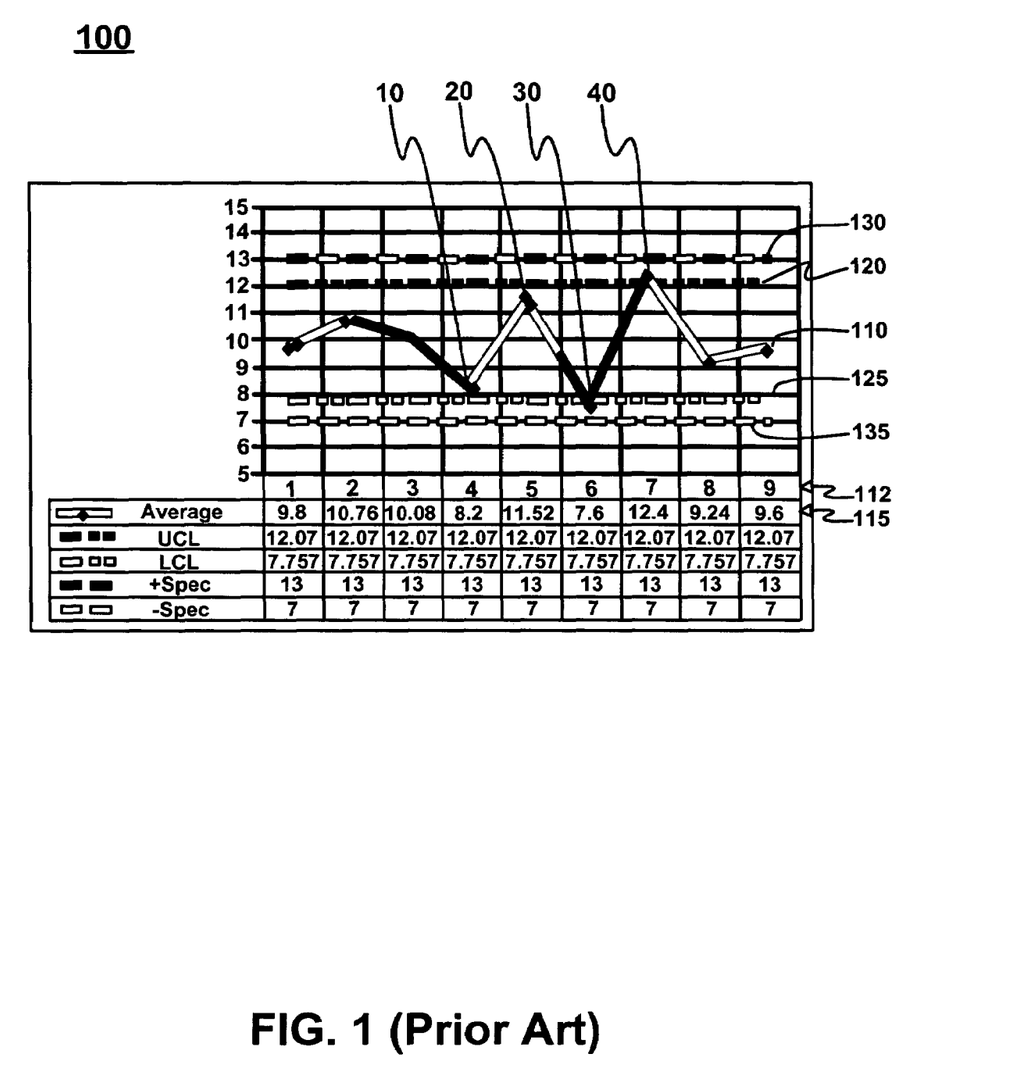
FIG. 1 is a Process Control Chart (PCC) of a measured parameter of sequential batches of parts being fabricated in a process.

A Process Control Chart (PCC) 100, referring to FIG. 1, is used to track trend 110 of measured parameters of parts being fabricated in a process. The averages 115 of a measured parameter for a run or batch 112 of parts are plotted as a trend 110 as they are processed. FIG. 1 shows 9 multiples of batch 112 processed and measured. Trend 110 is compared to predefined upper and lower control limits (heron referred to as UCL 120 and LCL 125 respectively). The UCL 120 and LCL 125 are determined from evaluating the process's capability for meeting the specified parameter. UCL 120 and LCL 125 are usually defined as the standard deviation of the measured parameter after the fabrication process has been optimized. UCL 120 and LCL 125 are more restrictive than upper specified tolerance 130 and lower specified tolerance 135 for the specified parameter of the part. The fabrication process is monitored more closely when average 115 of a measured parameter of a batch 112 begins to track too closely to either UCL 120 or LCL 125, such as demonstrated by average data points 10 and 20. Average data points 30 and 40 demonstrate batches of the fabrication process that are out of control, at which time the fabrication process is stopped and adjusted. The fabrication process can also be adjusted so that trend 110 meets an average target value if performance of the population of parts needs to be adjusted.

Figure 2:
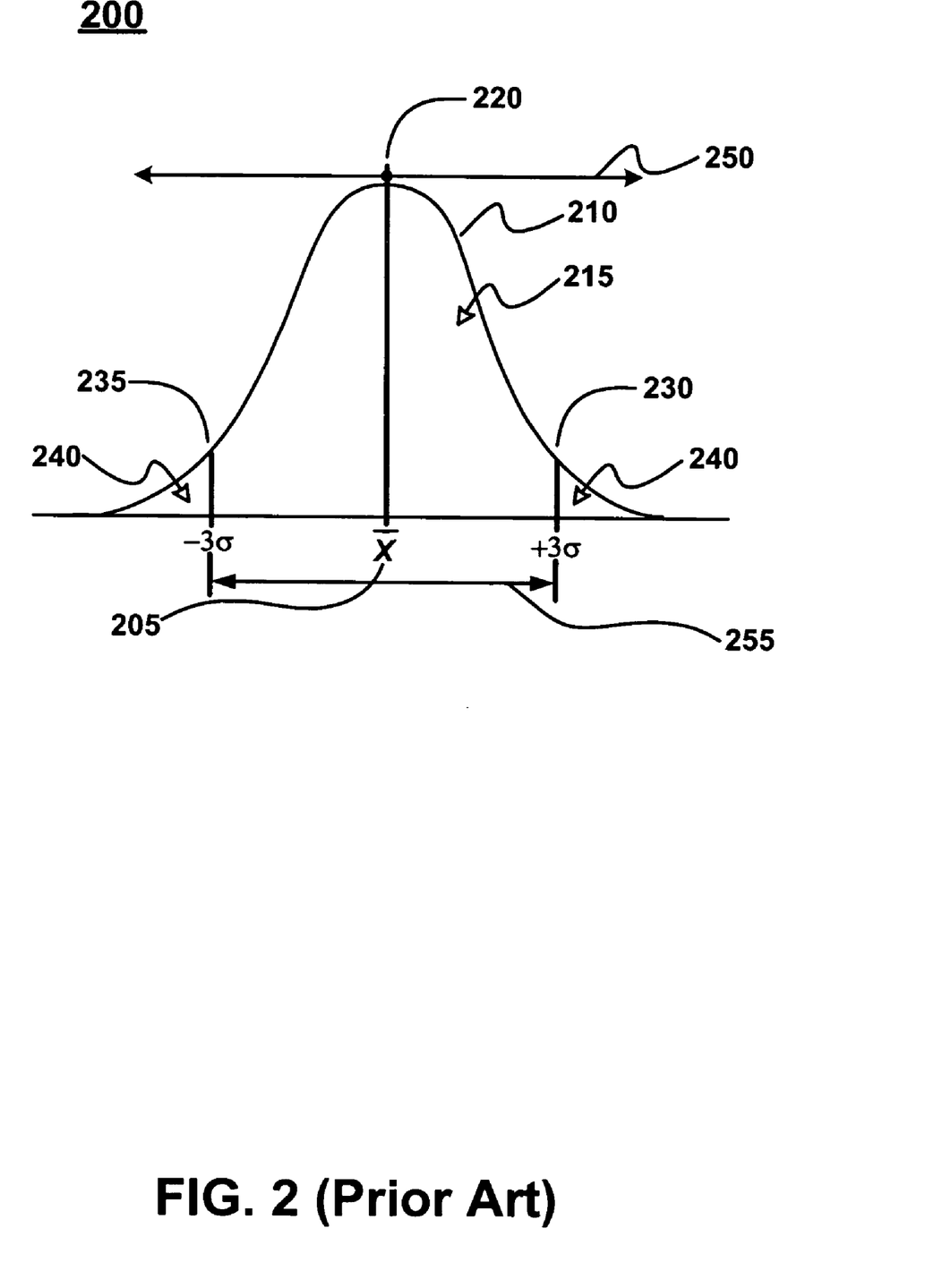
FIG. 2 is a plot of a measured parameter of a batch of parts that represents Statistical Process Control (SPC).

Referring to FIG. 2, plot 200 represents a concept of Statistical Process Control (SPC). It is similar in function as PCC 100. SPC 200 tracks the distribution 210 of a measured parameter of a population of parts and compares the distribution to the target mean value (or specified parameter 220) and the specified tolerance values. The specified tolerance value usually consists of an upper specified limit (USL 230) and a lower specified limit (LSL 235). Specified parameter 220 is typically the mean value 205 of the measured parameter of the part. There are variations in specification techniques that specify tolerances with values other than USL 230 and LSL 235. Discussion of these specification techniques is beyond the scope of this discussion. These specification techniques for tolerance specification can usually be translated into a USL 230 and a LSL 235. A manufacturer of a part will use SPC 200 to adjust a process to produce parts closer to specified parameter 220. Adjusting a process to produce parts with measured parameters closer to specified parameter 220 will produce more parts that are in the acceptable range 215. A manufacturer may also choose to discard parts whose measured parameters exceed USL 230 or LSL 235 and are in the unacceptable range 240.

Referring to FIG. 2, a specification technique is used in an attempt to control the shape of distribution 210. This specification technique specifies terms known as Cp and Cpk of distribution 210. Without presenting a detailed explanation of Cp and Cpk, in short, Cp specifies width 255 of acceptable range 215. Cpk specifies range 250 that specified mean value 205 can vary within.

The aforementioned process control techniques are exemplary of techniques used in industry for controlling yields of manufactured parts. These examples are not an exhaustive list of all process control techniques. Inclusion or omission of a process control technique does not limit the embodied invention. One schooled in the art will recognize that there are many other examples of process control techniques.

All of these techniques control trends and distributions in the populations of parts in attempts to control the yields. Parts that have parameters specified with these control techniques assume that if the specified target, tolerance values, and the distribution of the population for the specified parameter are met, then the part will function properly. Assuring function in this manner can have unnecessary associated cost for controlling yield. Using the criteria of specified target and tolerance values, and specifying the shape of a distribution plot can lead to throwing away parts unnecessarily and increase the overall cost to fabricate a part.

SUMMARY OF THE INVENTION

A disposition process involves a part proceeding through a sequence of fabrication steps. The process involves obtaining a specified parameter for the part at an individual fabrication step; measuring the specified parameter of the part at the individual fabrication step; obtaining a final specified parameter for the part upon completion of the sequence of fabrication steps; and disposing the part at the individual fabrication step. Disposing the part uses a calculation of probability of the part meeting the final specified parameter.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

DETAILED DESCRIPTION

It is the goal of the embodied invention to address the challenges presented by the cited prior art while achieving a cost effective means of assuring the function and performance of a manufactured part.

The embodied invention takes advantage of the large amounts of data collected in the fabrication of a component, assembly, sub-assembly, device, or part. From hereon the word "part" will be used to infer a singular or plural component, assembly, sub-assembly, device, part or anything that is manufactured, processed, or fabricated.

The embodied invention disposes a part at an individual step in a fabrication process. The disposition process utilizes the specified parameter of the part that the fabrication step is producing; the measurement of the specified parameter for the part to be disposed; and the specified final parameter of the part upon completion of the sequence of fabrication steps. The part is typically one part in a batch of parts being processed through a series of sequential fabrication steps, but can also be the entire batch of parts.

Figure 3:
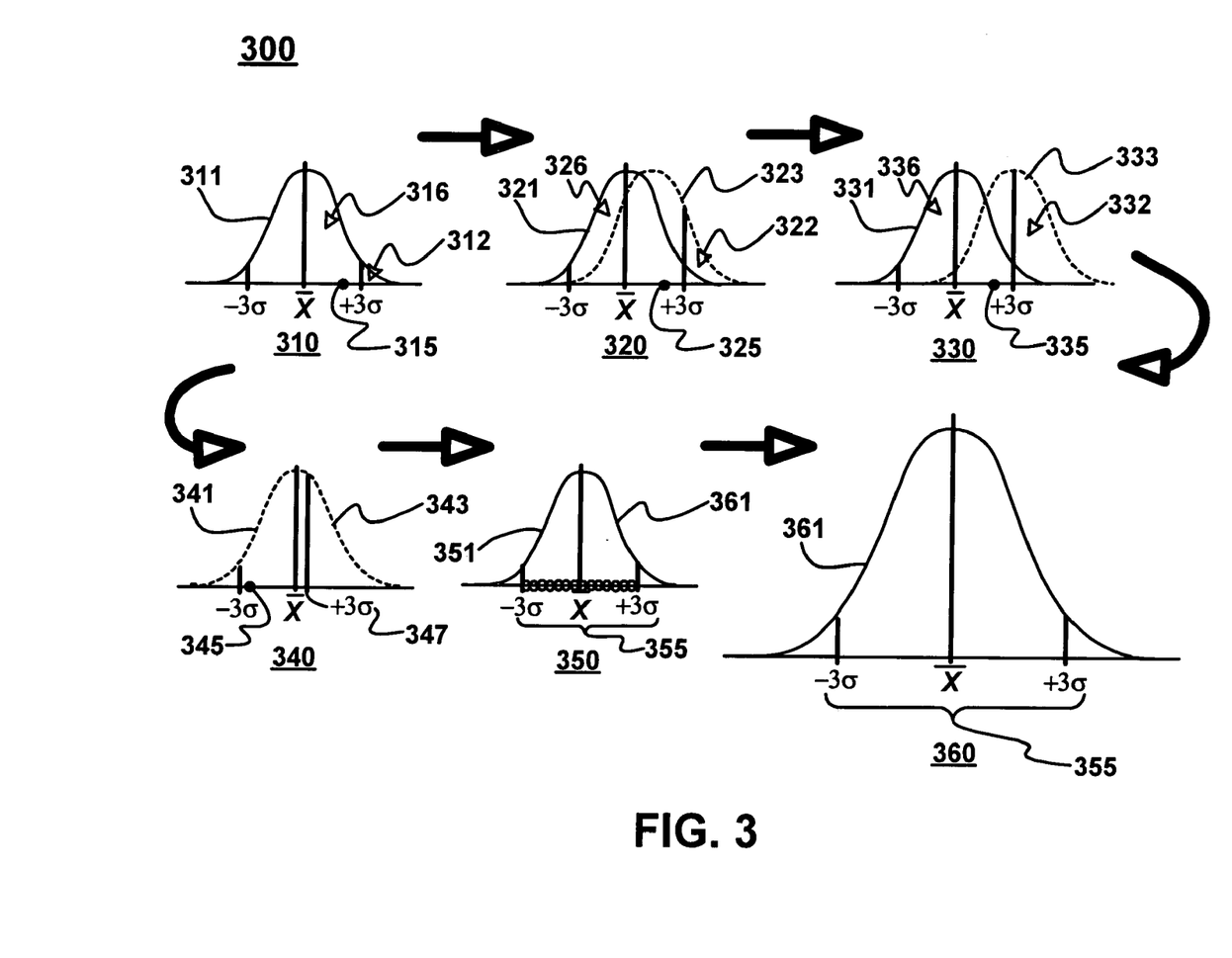
FIG. 3 is a schematic diagram representing a part proceeding sequential through fabrication steps in accordance with one embodiment of the present invention.

FIG. 3 is a representation of the embodied invention wherein a specified parameter of a part is measured as the part proceeds through sequential fabrication steps 300. (From heron, measured parameter will infer measurement of the specified parameter.) When the part enters sequential fabrication steps 300 at step 310, no knowledge is available of what the magnitude of the measured parameter will be. What is available is a predicted distribution 311 for the measured parameter. Predicted distribution 311 is typically characterized by a specified mean value ($\bar{X}$) of the specified value and its upper and lower specified tolerances (+3σ and −3σ respectively). Characterization of a distribution as previously cited in the prior art can also comprise a specification of Cp and Cpk. Predicted distributions 321, 331, and 341 are similar to predicted distribution 311. Once the part has completed step 310, predicted distribution 311 is no longer needed to understand what measured parameter 315 will be. Measured parameter 315 is known. FIG. 3 shows measured parameter 315 as disposed to being acceptable since measured parameter 315 is inside acceptable range 316.

The part proceeds to step 320, where again no knowledge is available of what the magnitude of the measured parameter will be. What are available are a predicted distribution 321 for the measured parameter at step 320 as well as predicted distribution 323, which is a combination of measured parameter 315 and predicted distribution 361 for the final specified parameter of the part. Measured parameter 315 will shift predicted distribution 323 depending on where it lies within predicted distribution 311. Once the part has completed step 320, predicted distribution 321 is no longer needed to understand what measured parameter 325 will be. Measured parameter 325 is known.

Predicted distribution 323 (as well as predicted distributions 333 and 343) comprise an $\bar{X}$, +3σ and −3σ. For the purpose of clarity, $\bar{X}$, +3σ and −3σ are not shown in FIG. 3 for predicted distributions 323, 333 and 343.

FIG. 3 shows measured parameter 325 is disposed to being acceptable since measured parameter 325 is inside acceptable range 326. Acceptable range 326 and unacceptable range 312 are defined by +3σ and −3σ, which for step 320 are functions of predicted distribution 321. Unacceptable range 312 is associated with +3σ. A similar unacceptable range is associated with −3σ but is not shown for the purpose of clarity of FIG. 3.

The part proceeds to step 330, where again no knowledge is available of what the magnitude of the measured parameter will be. What are available are a predicted distribution 331 for the measured parameter at step 330 as well as predicted distribution 333, which again is a combination of measured parameter 325 and predicted distribution 361 for the final specified parameter of the part. As depicted in FIG. 3, measured parameter 335 is disposed to being acceptable since measured parameter 335 is inside acceptable range 336.

As the part proceeds through sequential fabrication steps 300, unacceptable ranges 312, 322, and 332 change. Unacceptable ranges 312, 322, and 332 are increasing in area because of the location of measured parameter 315, 325, and 335 in their respective predicted distributions 311, 321, and 331. In one embodiment of the present invention as depicted in FIG. 3, it is recognized that if tolerance value 347 at step 340 is not adjusted, the part will fail the final specified parameter at final step 360. Tolerance value 347 of step 340 is changed and predicted distribution 343, which is a combination of measured parameter 335 and predicted distribution 361 for the final specified parameter of the part, is made to be similar to predicted distribution 341. This is accomplished by obtaining a tolerance value that will move the $\bar{X}$ of predicted distribution 343 to be more in line with the $\bar{X}$ of predicted distribution 341.

In the embodiment presented in FIG. 3, measured parameter 345 has moved the $\bar{X}$ of predicted distribution 343 to be more in line with the $\bar{X}$ of predicted distribution 341. In the embodiment presented in FIG. 3, the part upon entering step 350 may have a measured parameter encompass a range 355 that spans from −3σ to +3σ of step 350. It is also recognized that range 355 has approached a span similar from −3σ to +3σ of the final specified parameter at step 360.

A numeric example follows that is analogues to sequential fabrication steps 300 of FIG. 3 and the embodied invention. The presented numeric example demonstrates that the part upon entering step 350 can have a parameter that spans a range, which is similar for both step 350 and the final specified parameter at step 360. The numeric identifiers for predicted distributions 311, 321, 331, 341 and 351 for the specified parameters of steps 310-350 are assigned the alpha identifiers A, B, C, D, and E, and the final specified parameter 360 is identified as F. The specified parameter at each individual step 310-350 is 10±3, and the final specified parameter F (360) is 50±3. In other words, A+B+C+D+E=F. Considering the initial situation of fabrication step 310, the specified parameter for fabrication step 310 is 10±3. Since there is no prior fabrication step, the predicted parameter A is given by the dynamic specification expression:

$$A = 10 \begin{matrix} +\sqrt{\frac{(53-50)^2}{5}} = \sqrt{\frac{3^2}{5}} = 1.34 \\ -\sqrt{\frac{(50-47)^2}{5}} = \sqrt{\frac{3^2}{5}} = 1.34 \end{matrix}$$

where 10 is the specified mean value $\overline{X}$, +1.34 is +3σ and −1.34 is −3σ for the predicted parameter A.

As the part proceeds to fabrication step 320, predicted parameter A is no longer needed to understand what measured parameter A will be. Measured parameter A is known. The dynamic specification expression for predicted parameter B becomes:

$$B = 10 \begin{matrix} +\sqrt{\frac{(53-(A+40))^2}{4}} \\ -\sqrt{\frac{((A+40)-47)^2}{4}} \end{matrix}$$

or 10±3 if the specified tolerance is a 3σ value.

Similarly, as the part proceeds to fabrication step 330, predicted parameter B is no longer needed to understand what measured parameter B will be. Measured parameter B is known. The dynamic specification expression for predicted parameter C becomes:

$$C = 10 \begin{matrix} +\sqrt{\frac{(53-(A+B+30))^2}{3}} \\ -\sqrt{\frac{((A+B+30)-47)^2}{3}} \end{matrix}$$

or 10±3 if the specified tolerance is a 3σ value.

Similarly, as the part proceeds through fabrication steps 340 and 350, predicted parameters D and E are no longer needed to understand what measured parameter D and E will be. Measured parameter D and E are known. The dynamic specification expression for predicted parameter D and E become:

$$D = 10 \begin{matrix} +\sqrt{\frac{(53-(A+B+C+20))^2}{2}} \\ -\sqrt{\frac{((A+B+C+20)-47)^2}{2}} \end{matrix}, \text{ and}$$

$$E = 10 \begin{matrix} +\sqrt{\frac{(53-(A+B+C+E+10))^2}{1}} = 53-(A+B+C+D+10) \\ -\sqrt{\frac{((A+B+C+E+10)-47)^2}{1}} = (A+B+C+D+10)-47 \end{matrix}$$

or 10±3 for D and E if the specified tolerance is a 3σ value.

It is presented that, as the measured parameters A-E become known, the prediction for the final specified parameter F becomes more accurate. For example, if all measured parameters A-E were equal to the specified mean value 10 ($\overline{X}$)

of each of their respective predicted distributions, then the predicted distribution for E (predicted distribution 351 of FIG. 3) would be the same as predicted distribution 361 for the final specified parameter F of the part. The dynamic specification expression for predicted parameter E becomes:

$$E = 10 \begin{matrix} +53-(A+B+C+D+10) = 53-(10+10+10+10+10) = 3 \\ -(A+B+C+D+10)-47 = (10+10+10+10+10)-47 = 3 \end{matrix}$$

In another embodiment of the present invention the part is disposed of as scrap at step 330 before entering step 340. In another embodiment of the present invention the part is disposed for a rework process at step 330 before entering step 340.

The decision for a disposition of the part can be based on several factors. One possible factor is the cost associated with the part entering step 340. Parts will be thrown away at step 340 with tighter tolerance value 347. If step 340 is a low cost step, and if cost for the part entering step 340 is high, then more risk might be accepted at step 340. Conversely, if step 340 is a high cost step and if cost for the part entering 340 is low, then any risk might not be acceptable at step 340 and the part disposition could be scrap. A factor that can have priority over cost is the demand for the part. A shortage of parts either to keep the fabrication process running or to meet shipping quotas can be a very high priority and override cost.

Another factor is the probability that the part can be successfully processed through step 340 and meet the final specified parameter. A factor in calculating the probability is the history of the part through previous process steps such as 310, 320, and 330. Two parts with the same measured parameter at any given step can have different dispositions depending upon analyses of their accumulated previously measured parameters. Also a factor in calculating the probability of success through a step is the history of the subsequent sequential fabrication steps. Batches of previously processed parts can show a history of the subsequent sequential fabrication steps that may compensate for measured parameters from preceding sequential fabrication steps. Conversely, batches of previously processed parts can show a history of the subsequent sequential fabrication steps that may compound marginal measured parameters from preceding sequential fabrication steps.

It is possible to assign a risk threshold for a part that is based on several of the previously cited factors. A risk threshold can be assigned to a part at any step in a sequence of fabrication steps such as sequential fabrication steps 300 and compared to the parts probability of meeting the final specified parameter.

The aforementioned decision factors are not intended to be an exhaustive list of decision factors for processing a part further through sequential fabrication steps 300. One schooled in the art will recognize that there are many other decision factors that can be used.

It is typical to have a specified parameter that the part is expected to meet at each step in the sequence of fabrication steps. However, if subsequent sequential fabrication steps are producing measured parameters consistently offset from the specified parameter, it is possible to set a target value that is different than the specified parameter at a step to compensate for the difference. In doing so, the target value is substituted for the specified parameter. A target value can have different forms. Some of these can be a different mean value, a different tolerance value, or a combination of both.

Figure 4:
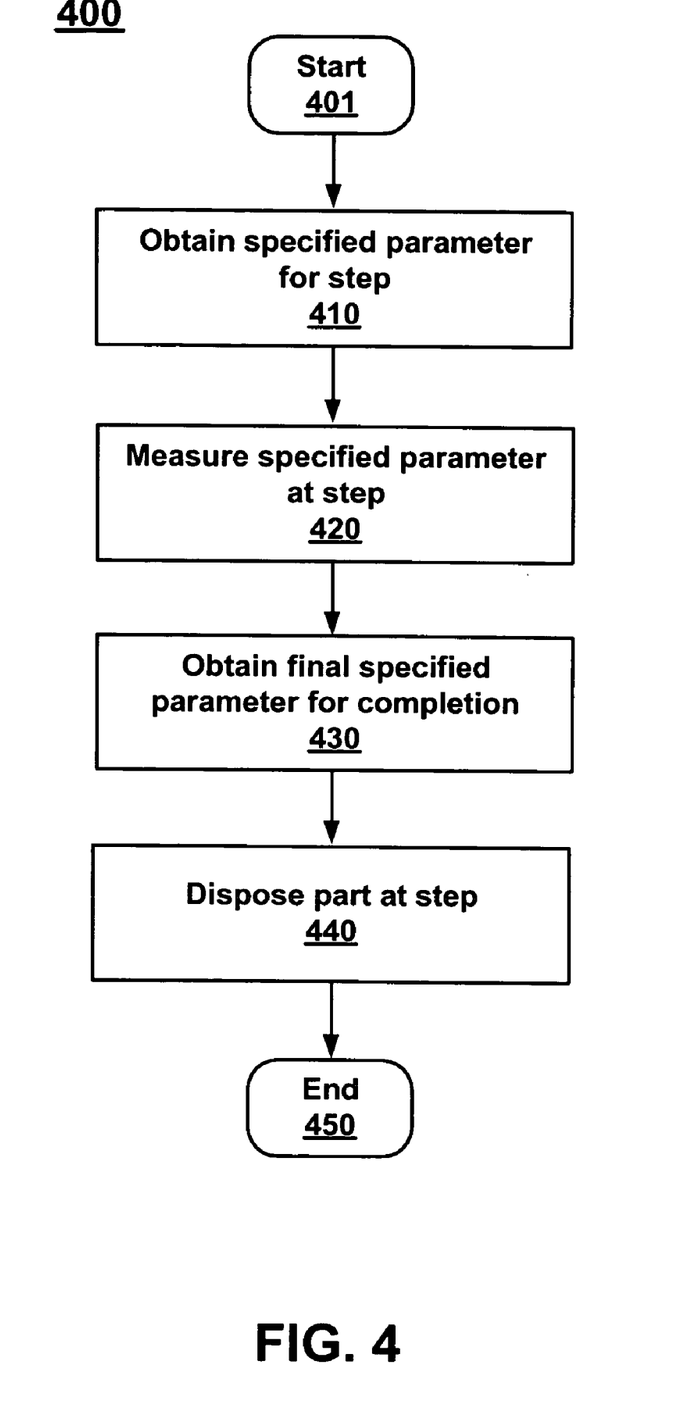
FIG. 4 is a flow chart illustrating steps of a disposition process in accordance with one embodiment of the present invention.

FIG. 4 is a flow chart of a process 400 in which particular steps are performed in accordance with an embodiment of the present invention for disposing a part proceeding through sequential process steps. Process 400 is performed for at least one fabrication step as shown in FIG. 4. FIG. 4 includes processes of the present invention, which in one embodiment, are carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium. Although specific steps are disclosed in process 400, such steps are exemplary. That is, the present invention is well suited to performing various other steps or variations of the steps recited in FIG. 4. Within the present embodiment, it should be appreciated that the steps of process 400 may be performed by software, by hardware, by an assembly mechanism, through human interaction, or by any combination of software, hardware, assembly mechanism, and human interaction.

In step 401 of process 400, a part suitable for proceeding through sequential fabrication steps (as shown in FIG. 3) enters the disposition process, in an embodiment of the present invention.

In step 410 of process 400, a specified parameter for the part at an individual fabrication step (as shown in FIG. 3) is obtained, in an embodiment of the present invention.

In step 420 of process 400, the specified parameter for the part at the individual fabrication steps (as shown in FIG. 3) is measured, in an embodiment of the present invention.

In step 430 of process 400, the final specified parameter for the part upon completion of the sequential fabrication steps (as shown in FIG. 3) is obtained, in an embodiment of the present invention.

In step 440 of process 400, the part is disposed at the individual fabrication step (as shown in FIG. 3) using the probability that the part will meet the final specified parameter, in an embodiment of the present invention.

In step 450 of process 400, the part exits the disposition process (as shown in FIG. 3), in an embodiment of the present invention.

Figure 5:
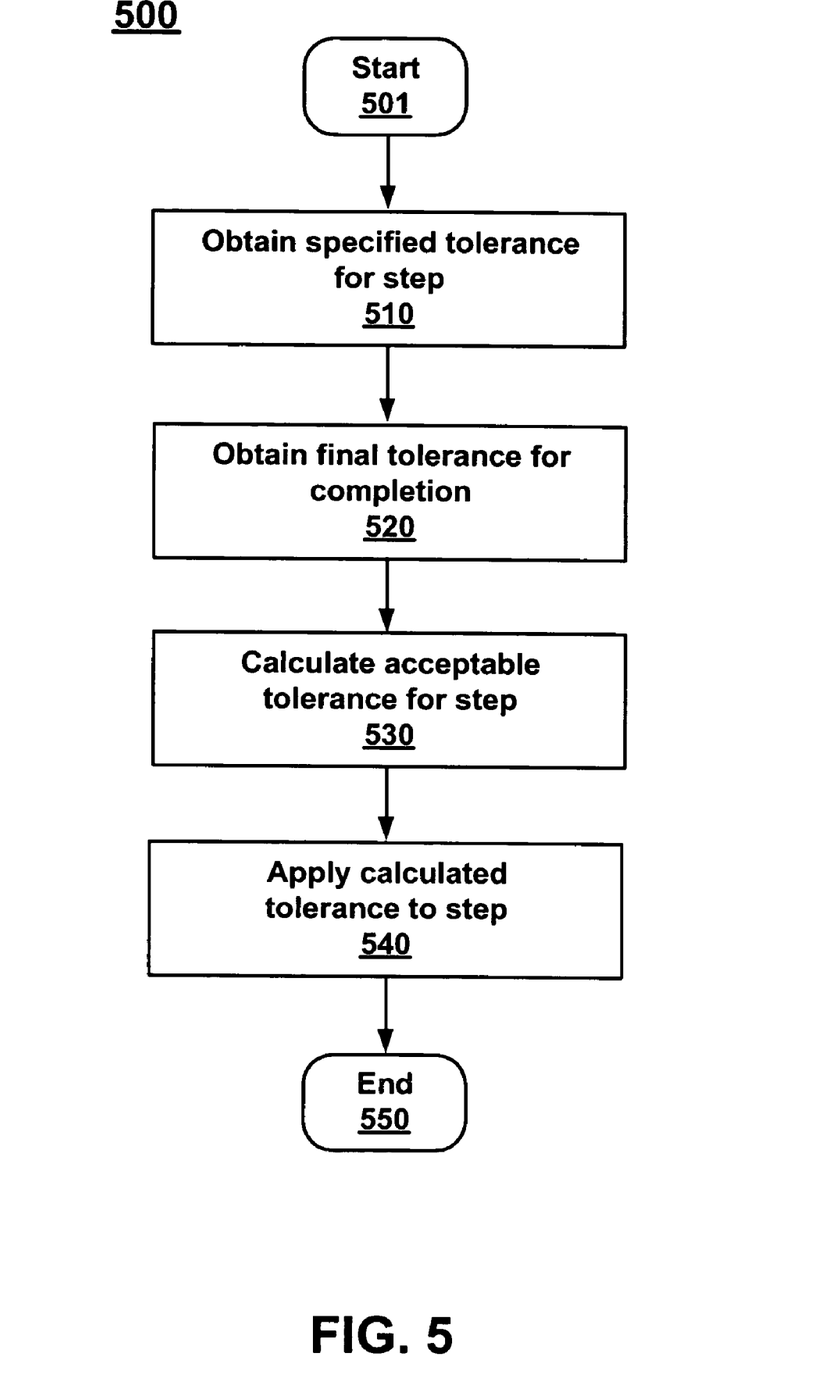
FIG. 5 is a flow chart illustrating steps of a specification adjusting process in accordance with another embodiment of the present invention.

FIG. 5 is a flow chart of a process 500 in which particular steps are performed in accordance with an embodiment of the present invention for a specification adjusting process for a part proceeding through sequential process steps. Process 500 is performed for at least one fabrication step as shown in FIG. 5. FIG. 5 includes processes of the present invention, which in one embodiment, are carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium. Although specific steps are disclosed in process 500, such steps are exemplary. That is, the present invention is well suited to performing various other steps or variations of the steps recited in FIG. 5. Within the present embodiment, it should be appreciated that the steps of process 500 may be performed by software, by hardware, by an assembly mechanism, through human interaction, or by any combination of software, hardware, assembly mechanism, and human interaction.

In step 501 of process 500, a part suitable for proceeding through sequential fabrication steps (as shown in FIG. 3) enters a specification adjusting process, in an embodiment of the present invention.

In step 510 of process 500, a specified tolerance of a parameter for the part at an individual fabrication step (as shown in FIG. 3) is obtained, in an embodiment of the present invention.

In step 520 of process 500, the final tolerance for the part upon completion of the sequential fabrication steps (as shown in FIG. 3) is obtained, in an embodiment of the present invention.

In step 530 of process 500, an acceptable tolerance of a parameter for the part at an individual fabrication step (as shown in FIG. 3) is calculated, in an embodiment of the present invention.

In step 540 of process 500, the calculated tolerance at the individual fabrication step (as shown in FIG. 3) is applied, in an embodiment of the present invention.

In step 550 of process 500, the part exits the specification adjustment process (as shown in FIG. 3), in an embodiment of the present invention.

Figure 6:
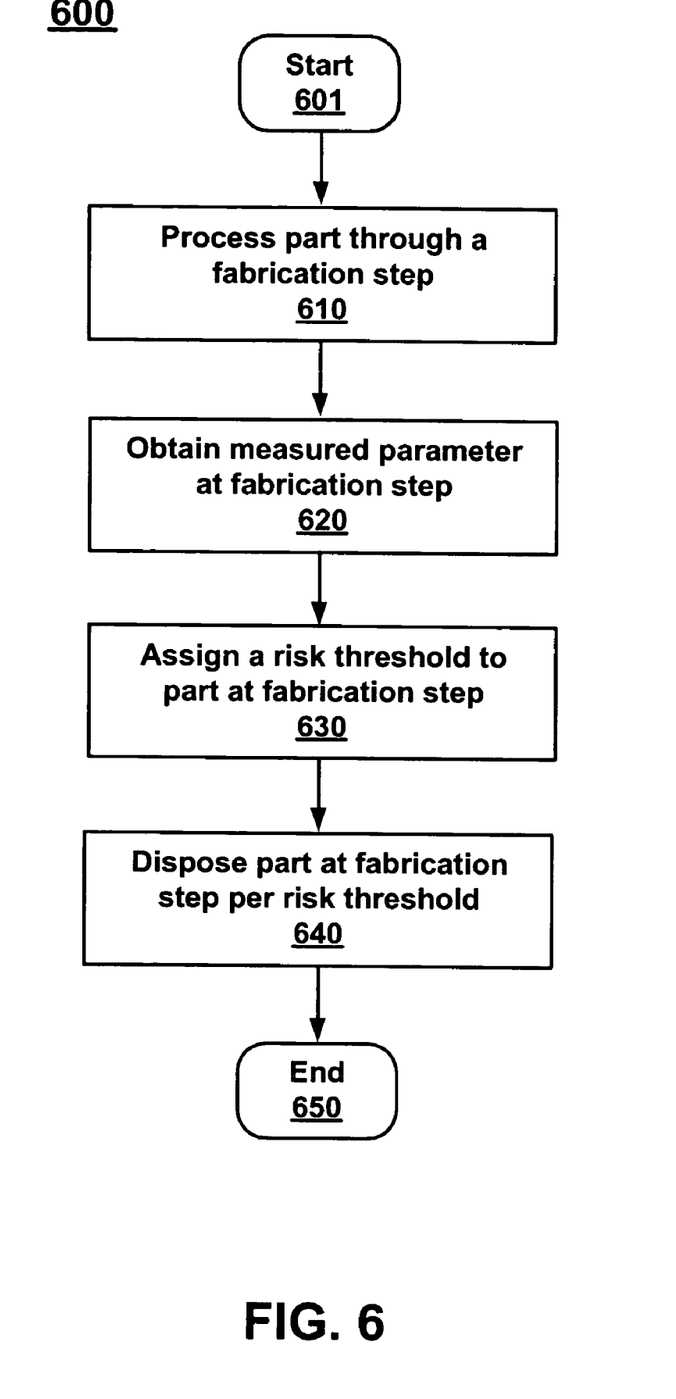
FIG. 6 is a flow chart illustrating steps of a disposition process in accordance with another embodiment of the present invention.

FIG. 6 is a flow chart of a process 600 in which particular steps are performed in accordance with an embodiment of the present invention for disposing a part proceeding through sequential process steps. Process 600 is performed for at least one fabrication step as shown in FIG. 6. FIG. 6 includes processes of the present invention, which in one embodiment, are carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium. Although specific steps are disclosed in process 600, such steps are exemplary. That is, the present invention is well suited to performing various other steps or variations of the steps recited in FIG. 6. Within the present embodiment, it should be appreciated that the steps of process 600 may be performed by software, by hardware, by an assembly mechanism, through human interaction, or by any combination of software, hardware, assembly mechanism, and human interaction.

In step 601 of process 600, a part suitable for proceeding through sequential fabrication steps (as shown in FIG. 3) enters a disposition process, in an embodiment of the present invention.

In step 610 of process 600, a part at an individual fabrication step (as shown in FIG. 3) is processed, in an embodiment of the present invention.

In step 620 of process 600, a measured parameter at an individual fabrication steps (as shown in FIG. 3) is obtained, in an embodiment of the present invention.

In step 630 of process 600, a risk threshold for the part is assigned, in an embodiment of the present invention.

In step 640 of process 600, the part at the individual fabrication step is disposed using the assigned risk threshold, in an embodiment of the present invention.

In step 650 of process 600, the part exits the disposition process, in an embodiment of the present invention.

What is claimed is:

1. A disposition process involving a part proceeding through sequential fabrication steps, said process comprising:
   obtaining a specified parameter for said part at an individual fabrication step;
   measuring said specified parameter of said part at said individual fabrication step;
   obtaining a final specified parameter for said part upon completion of said sequential fabrication steps; and
   disposing said part at said individual fabrication step wherein said disposing uses a calculation of probability of said part meeting said final specified parameter.

2. The process as recited in claim 1 wherein said obtaining specified parameter comprising:
   obtaining a specified mean value.

3. The process as recited in claim 1 wherein said obtaining specified parameter comprising:
   obtaining a target mean value.

4. The process as recited in claim 1 wherein said obtaining specified parameter further comprising:
   obtaining a specified target value.

5. The process as recited in claim 1 wherein said obtaining specified parameter further comprising:
   obtaining a target tolerance value.

6. The process as recited in claim 1 wherein said obtaining final specified parameter comprising:
   obtaining a specified mean value and a specified tolerance value.

7. The process as recited in claim 1 wherein said obtaining final specified parameter comprising:
   obtaining a target mean value and a target tolerance value.

8. The process as recited in claim 1 wherein said calculation is based on:
   said measuring said specified parameter at said individual fabrication step;
   accumulating previous said measured parameters of said part from preceding said sequential fabrication steps; and
   analyzing history of said specified parameter tolerance for subsequent said sequential fabrication steps.

9. The process as recited in claim 1 wherein said disposing is further based upon:
   calculating the cost of said part.

10. The process as recited in claim 1 wherein said disposing is further based upon:
    calculating the demand for said part.

11. A specification adjusting process involving a part proceeding through sequential fabrication steps, said process comprising:
    obtaining a specified tolerance of a parameter for said part at an individual fabrication step;
    obtaining a final tolerance for said part at completion of said sequential fabrication steps;
    calculating an acceptable tolerance of a parameter of said part at said individual fabrication step; and
    applying a calculated tolerance for said part at said individual fabrication step.

12. The process as recited in claim 11 wherein said obtaining said specified tolerance comprises:
    obtaining an acceptable range for a target value.

13. The process as recited in claim 11 wherein said obtaining said specified tolerance comprises:
    obtaining a characterization of a distribution of said specified tolerance.

14. The process as recited in claim 11 wherein said obtaining said final tolerance comprises:
    obtaining a range for a target value.

15. The process as recited in claim 11 wherein said obtaining said final tolerance comprises:
    obtaining a characterization of a distribution of said final tolerance.

16. The process as recited in claim 11 wherein said calculating is based upon:
    analyzing an accumulation of previously measured parameters of said part from preceding said sequential fabrication steps; and
    analyzing a history of said specified parameter tolerance for subsequent said sequential fabrication steps.

17. A disposition process involving a part proceeding through sequential fabrication steps, said process comprising:
    processing said part through an individual fabrication step;
    obtaining a measured parameter of said part at said individual fabrication step;
    assigning a risk threshold to said part; and
    disposing said part at said individual fabrication step wherein said disposing uses said risk threshold.

18. The process as recited in claim 17 wherein said assigning said risk threshold comprises:
    analyzing said measured parameter at said individual fabrication step;
    accumulating previous said measured parameter of said part from preceding said sequential fabrication steps; and
    calculating probability for said part meeting a final specified parameter.

19. The process as recited in claim 17 wherein said assigning said risk threshold comprises:
    revising said risk threshold at subsequent said individual fabrication step.

* * * * *